US012562029B2

(12) United States Patent
Mayeroff

(10) Patent No.: US 12,562,029 B2
(45) **Date of Patent: *Feb. 24, 2026**

(54) GAMING DEVICE AND METHOD OF CONDUCTING A GAME WITH A CHANGEABLE BONUS VALUE FEATURE

(71) Applicant: Konami Gaming, Inc., Las Vegas, NV (US)

(72) Inventor: Jason Mayeroff, Reno, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,957

(22) Filed: Aug. 3, 2023

(65) Prior Publication Data

US 2024/0119800 A1 Apr. 11, 2024

Related U.S. Application Data

(63) Continuation of application No. 17/690,658, filed on Mar. 9, 2022, now Pat. No. 11,756,385, which is a continuation of application No. 17/009,619, filed on Sep. 1, 2020, now Pat. No. 11,308,763, which is a continuation of application No. 15/387,262, filed on Dec. 21, 2016, now Pat. No. 10,796,531, which is a continuation of application No. 14/794,529, filed on Jul. 8, 2015, now Pat. No. 9,564,017, which is a continuation of application No. 14/318,486, filed on Jun. 27, 2014, now Pat. No. 9,111,410, which is a continuation of application No. 10/815,304, filed on Mar. 31, 2004, now Pat. No. 8,777,719.

(60) Provisional application No. 60/464,937, filed on Apr. 22, 2003.

(51) Int. Cl.
*A63F 9/24* (2006.01)
*A63F 11/00* (2006.01)
*G06F 13/00* (2006.01)
*G06F 17/00* (2019.01)
*G07F 17/32* (2006.01)
*G07F 17/34* (2006.01)

(52) U.S. Cl.
CPC ...... *G07F 17/3267* (2013.01); *G07F 17/3211* (2013.01); *G07F 17/3244* (2013.01); *G07F 17/34* (2013.01)

(58) Field of Classification Search
CPC ... G07F 17/32; G07F 17/3201; G07F 17/3214
USPC .............................. 463/1, 20, 22, 29, 30, 39
See application file for complete search history.

(56) References Cited

U.S. PATENT DOCUMENTS 5,513,846 A 5/1996 Niederlein et al.
5,697,843 A 12/1997 Manship et al.
5,823,874 A 10/1998 Adams
(Continued)

*Primary Examiner* — Adetokunbo O Torimiro
(74) *Attorney, Agent, or Firm* — Howard & Howard Attorneys PLLC

(57) ABSTRACT

A bonus device and method are set forth for gaming machines. The bonus device is configured as a two dimensional display or three dimensional object, such as a sphere, box, or football shape, which can be controlled to rotate, spin or move to display a bonus. The bonus device is embedded with display technology that allows the bonus amounts, to change upon certain conditions in the base game such as an increased number of credits wagered, combinations achieved in the base game, or other random occurrences.

17 Claims, 6 Drawing Sheets

(56) References Cited

U.S. PATENT DOCUMENTS

| | | | | |
|---|---|---|---|---|
| 6,059,658 | A | 5/2000 | Mangano et al. | |
| 6,089,978 | A | 7/2000 | Adams | |
| 6,146,273 | A | 11/2000 | Olsen | |
| 6,155,925 | A | 12/2000 | Giobbi et al. | |
| 6,203,429 | B1 * | 3/2001 | Demar | G07F 17/32 463/20 |
| 6,315,666 | B1 | 11/2001 | Mastera et al. | |
| 7,470,181 | B2 | 12/2008 | Gauselmann | |
| 7,736,228 | B2 | 6/2010 | Seelig et al. | |
| 2002/0065126 | A1 | 5/2002 | Miller et al. | |
| 2003/0060281 | A1 | 3/2003 | Vancura | |
| 2003/0064790 | A1 | 4/2003 | Hughs-Baird et al. | |
| 2004/0018871 | A1 | 1/2004 | Seelig et al. | |
| 2004/0092315 | A1 | 5/2004 | Boyd et al. | |
| 2006/0030403 | A1 | 2/2006 | Lafky et al. | |
| 2007/0120320 | A1 | 5/2007 | Miltenberger et al. | |
| 2007/0149268 | A1 | 6/2007 | Gauselmann | |
| 2009/0082086 | A1 | 3/2009 | Seelig et al. | |
| 2010/0210347 | A1 | 8/2010 | Seelig et al. | |
| 2012/0115606 | A1 | 5/2012 | Seelig | |
| 2013/0157741 | A1 | 6/2013 | Pacey et al. | |
| 2014/0200066 | A1 * | 7/2014 | Joshi | G07F 17/34 463/20 |
| 2014/0206442 | A1 * | 7/2014 | Hollander | G07F 17/3206 463/31 |
| 2014/0228091 | A1 * | 8/2014 | Berman | G07F 17/34 463/20 |

* cited by examiner

GAMING DEVICE AND METHOD OF CONDUCTING A GAME WITH A CHANGEABLE BONUS VALUE FEATURE

CROSS-REFERENCE TO RELATED APPLICATION

This application is a continuation of U.S. patent application Ser. No. 17/690,658, filed Mar. 9, 2022, which is a continuation of U.S. patent application Ser. No. 17/009,619, filed Sep. 1, 2020 (now U.S. Pat. No. 11,308,763, issued Apr. 19, 2022), which is a continuation of U.S. patent application Ser. No. 15/387,262, filed Dec. 21, 2016 (now U.S. Pat. No. 10,796,531, issued Oct. 6, 2020), which is a continuation of U.S. patent application Ser. No. 14/794,529, filed Jul. 8, 2015 (now U.S. Pat. No. 9,564,017, issued Feb. 7, 2017), which is a continuation of U.S. patent application Ser. No. 14/318,486, filed Jun. 27, 2014 (now U.S. Pat. No. 9,111,410 issued Aug. 18, 2015), which is a continuation of U.S. patent application Ser. No. 10/815,304, filed Mar. 31, 2004 (now U.S. Pat. No. 8,777,719 issued on Jul. 15, 2014), which claims the benefit of U.S. Provisional Application Ser. No. 60/464,937, filed Apr. 22, 2003, the disclosures of which are hereby incorporated by reference in their entirety.

TECHNICAL FIELD

This invention relates to gaming machines which include a bonus game and display and more particularly it relates to bonus displays and still more particularly moveable bonus displays.

BACKGROUND ART

Casino gaming machines are well known in the art. Such devices may be embodied as spinning reel slot machines, video slot machines. Video Poker machines or the like. These machines are played by a player making a wager and prompting play. A computer processor for the device selects and displays an outcome. For a slot machine, the processor randomly selects and displays symbols which combination or combinations define one or more winning outcomes. The player receives an award for each winning outcome and loses their wager for losing outcomes.

It has become popular to provide, for gaming devices such as slot machines, one or more bonus game features. As is known in the art, the player makes their wager and plays a base game obtaining winning and losing outcomes. When a trigger condition is obtained, the bonus feature is enabled. The bonus feature may entail the display of bonus outcome selections where the player makes a selection to reveal a bonus. In one popular game, a bonus feature is embodied as an electro-mechanical spinning "Wheel of Fortune" which spins to reveal a bonus amount.

One drawback of these bonus games is that the bonus feature display, when not in play or when the device is idle, does not function to actively attract players. The bonus displays of some games have an idle mode where they display simulated bonus awards or pictures consistent with the theme of the game. There is a need for a bonus display which has features adapted to attract players to the game when the game is idle.

The major drawback of such games, however, is that the awards in the bonus feature display remain a constant, static amount. There is a need for physical, moveable, bonus display device in which the awards in the bonus change, often increasing, upon certain conditions in the overall game, such as the player staking an increased number of coins or credits.

DESCRIPTION OF EMBODIMENTS

Figure 1:
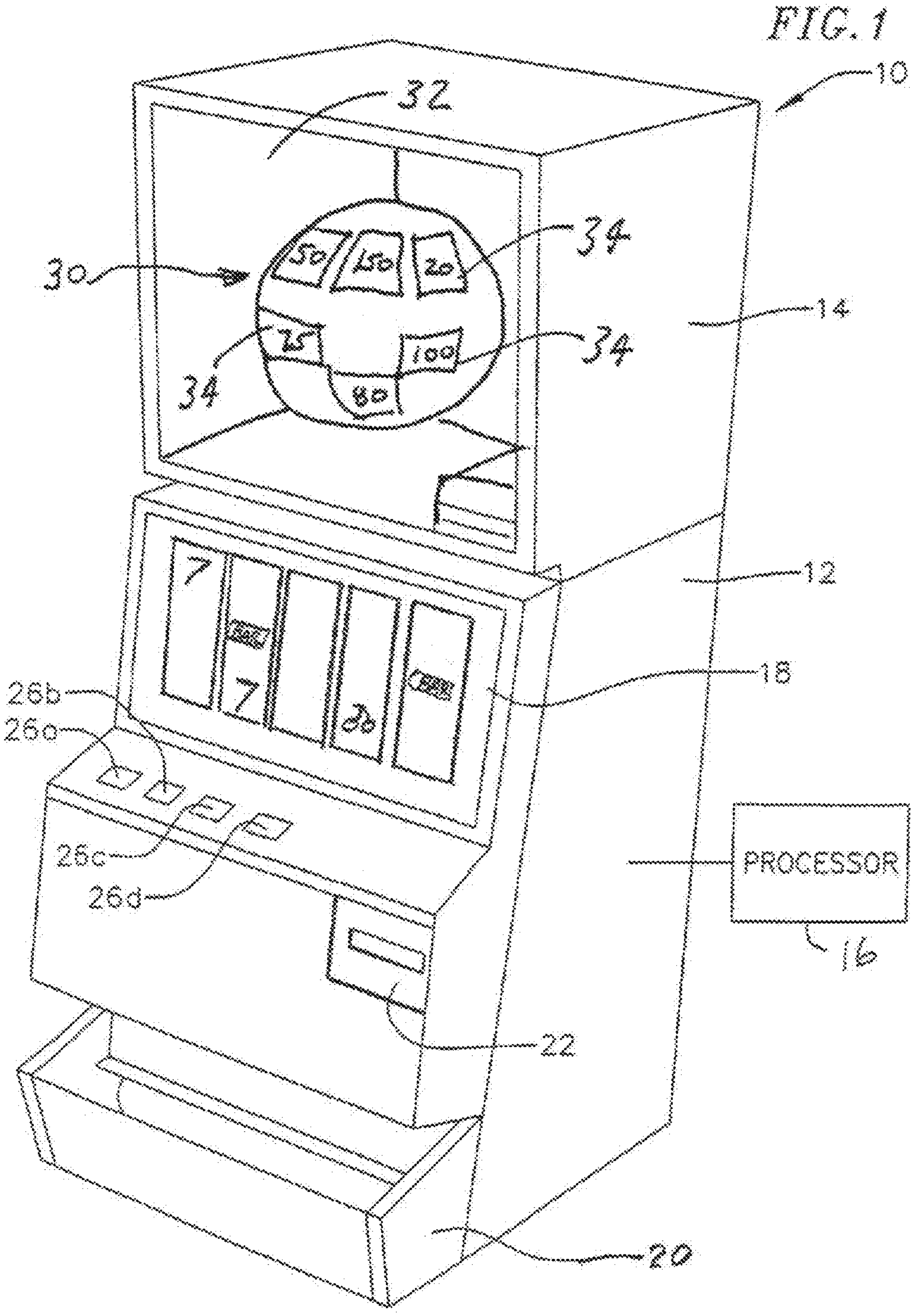
FIG. 1 shows an example of a device for playing one illustrative embodiment of the game using a wheel bonus selection display device.

Turning to FIG. 1 there is shown an embodiment of a gaming device 10 according to the present invention. The device 10 includes a housing 12 supporting a bonus device compartment 14. The housing 12 contains a game controlling computer processor 16, which controls the various aspects of the gaming device 10. As shown the housing 12 also mounts a base game display 18, which may be embodied as a video display such as a CRT, plasma or other electronic display or may be embodied as a view glass to view three or more electro-mechanical reels as is known in the art. For purposes of illustration, the base game display 18 is depicted as a video display of a five-reel slot machine game. It should be understood, however, that the base game may take any slot machine or gaming machine form such as by being a 3-Reel spinning reel slot machine. Video Poker game. Video Keno, Video Lottery, Video Blackjack or the like.

To control the processor 16 and the play of the base game, the housing mounts a plurality of control buttons positioned below the base game display 18. At **26*a* there is provided a cash out button which, if depressed by the player, controls the processor 16 to pay to the player in the form of tokens, voucher or the like, accumulated game credits in a manner well known in the art. Bet one button 26*b* enables the player to wager one unit at a time. Button 26*c* is a max-bet button that enables the player to wager the maximum amount for the play of the base game. Spin button 26*d*** prompts the play of the base game.

The aforementioned buttons or prompts may be also embodied as touch areas on a touch screen based game display 18.

To enable a player to accumulate game credits, the device 10 may also include a cash validator 22 of the type well known in the art. Other means such as a token acceptor (not shown) or debit or credit card reader 24 may be provided.

A token accepting tray 20 may also be provided to accept token dispensed by the device 10 when the player touches the cash out button **26*a***.

To play the base game, the player accumulates game credits in the device 10 as by inserting a cash note, script or voucher into the cash validator 22. The player then decides how much to wager. It will be assumed that the player decides to wage the maximum amount and therefore touches the max bet button 26*c*. The appropriate number of credits are deducted from the inventory of game credits and the processor 16 is prompted to randomly select and display at the base game display, a base game outcome represented by a matrix of game symbols. As is known with slot machine games, the matrix of symbols defines numerous pay lines, e.g., horizontal rows, diagonals, reflecting, through the matrix. The processor 16 tests each pay line that has been wagered upon and if a pay line has one of a predetermined schedule of winning outcomes or if the matrix has scattered symbols combinations, the player is issued an award. If a pay line does not embrace a winning symbol combination, the player loses their wager amount for that pay line. Thus the player may obtain numerous and frequent base game winning outcomes. For winning outcomes, the player receives an award typically in the form of game credits summed into the game credit inventory.

According to the present invention, one or more base game pay line or scattered symbol outcomes defines a bonus game trigger. Should the player obtain such an outcome (with the requisite amount wagered or the triggering pay line enabled by a wager) the processor 16 detects this condition and controls the gaming device 10 to enable the bonus phase. Alternatively, the base game may contain no apparent trigger combination that enables the bonus event. The wheel or other bonus apparatus may be set by the processor to be award at random, without the use of a trigger combination in the base game, in a "mystery prize" format.

Figure 2:
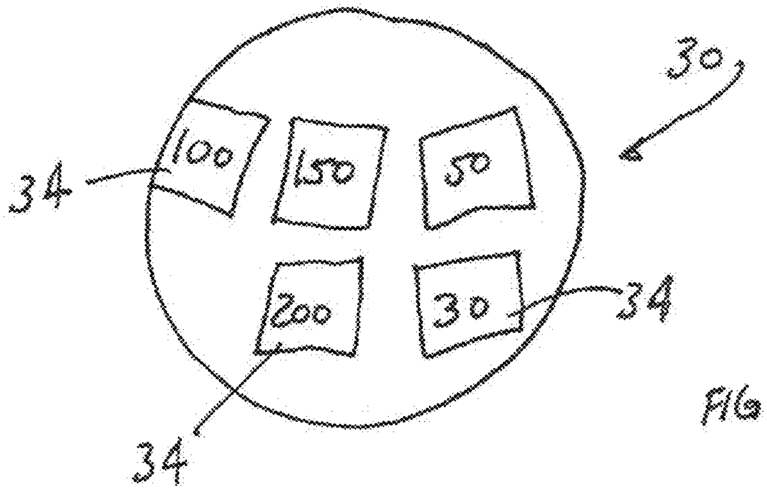
FIG. 2 shows an example of a spherical type bonus display device.

To provide for the play and presentation of the bonus phase of the gaming device 10, the compartment 14 includes a display that may be embodied as a physical, three-dimensional object, a two-dimensional physical display such as a wheel, or as a video display depicting a three-dimensional object. With reference to FIGS. 1 and 2 there is shown a rotatable wheel 30 contained within the compartment 14. Preferably the wheel 30 is mounted for rotation within the compartment 14 that is optionally covered with glass 32. To provide the three-dimensional effect using a video display, the display may be done using 3-D technology where the player is provided with viewing glasses (e.g., disposable 3-D glasses) or the display may be embodied as overlaying displays to produce the three-dimensional effect.

The wheel 30, includes a plurality of surface panels 34, each of which having a display of a bonus amount, at each section of the wheel. For example, and as suggested in FIG. 2, each panel 34 may have imprinted thereon a bonus amount. These display within the wheel use LED, LCD, liquid quartz, video or other display technology to provide for changing the awards amount at any panel during the course of the game. The number of bonus credits to be won by the player may change upon certain conditions in the overall game, such as the player wagering an increased number of coins or credits.

While the gaming device 10 is idle, the wheel 30 may be controlled to rotate to provide a visual display to attract players. Lights may be disposed on the wheel 30 and lit in conjunction with rotation to increase the visual attraction of the device 10.

When a bonus trigger condition is obtained, the processor 16 controls the bonus feature to select and display the bonus award for the player. With reference to FIGS. 1 and 2, the processor 16 randomly selects a bonus amount from a schedule of bonus amounts (the amounts may be arranged in a non-uniform probability distribution so that certain amounts are more likely to be selected than others) and controls the sphere 30 to display the amount. For example, the processor 16 may control the wheel or 3-D Object (which may represent an soccer ball, baseball, golf ball or other spherical object consistent with the theme of the base game), in a first mode where the wheel 30 rotates and processes through various bonus amounts to increase the excitement and anticipation prior to display of the amount to be awarded. Within the compartment 14 there may be provided lights to increase the visual appearance of the bonus device 30. Sound may also be provided to further contribute to the entertainment value of the bonus feature for the player and bystanders.

Figure 3:
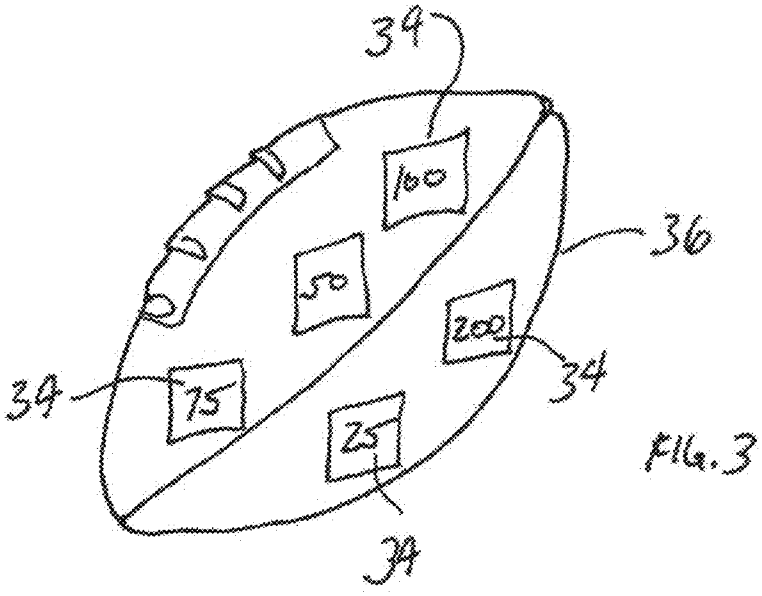
FIG. 3 shows an example of a display device in an ellipsoid shape of a football.

With reference to FIG. 3 there is shown an embodiment where the bonus feature includes a three-dimensional object simulating a football 36 having bonus revealing surface elements 34 thereon. When the bonus phase is triggered the football 36 is shown to spin and/or gyrate to eventually reveal the surface element with the bonus. The movement of the football 36 is preferably accompanied by sounds and lights to enhance the sensory impact of the bonus feature to the player and bystanders.

Figure 4:
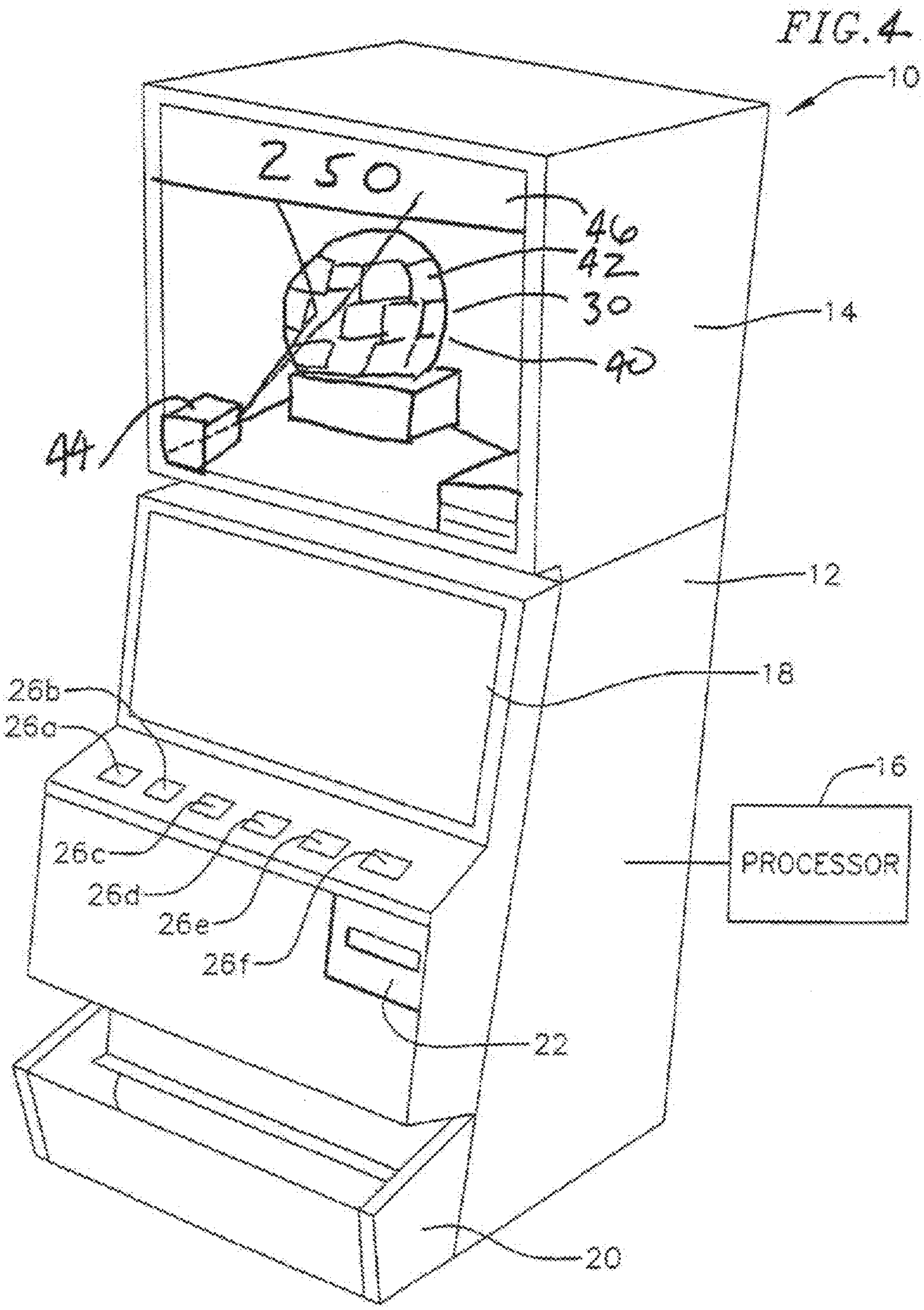
FIG. 4 shows an example of a device using a spherical display device and projection.

Turning to FIG. 4 there is disclosed another embodiment of the invention. According to this embodiment the three-dimensional object such as the sphere 30 is provided with a surface 40 having one or more reflecting elements 42. A projector 44 is disposed in the device 10 to project views onto the sphere 30 for reflection and display to the player. As shown, the glass 32 may have a panel 46 to receive the projection for the display of the same. Accordingly, the wheel 30 may be rotated while the device 10 is idle with the projector 44 projecting light onto the wheel 30 to create an attractive display to bring a play to the game. Upon placing a wager the processor 16 discontinues the idle mode for the display and device 10 base game is played by the player. Upon obtaining a triggering condition, the wheel 30 is rotated and the projector 44 ultimately projects the bonus to be awarded which is reflected by the sphere to the panel 46.

Figure 5:
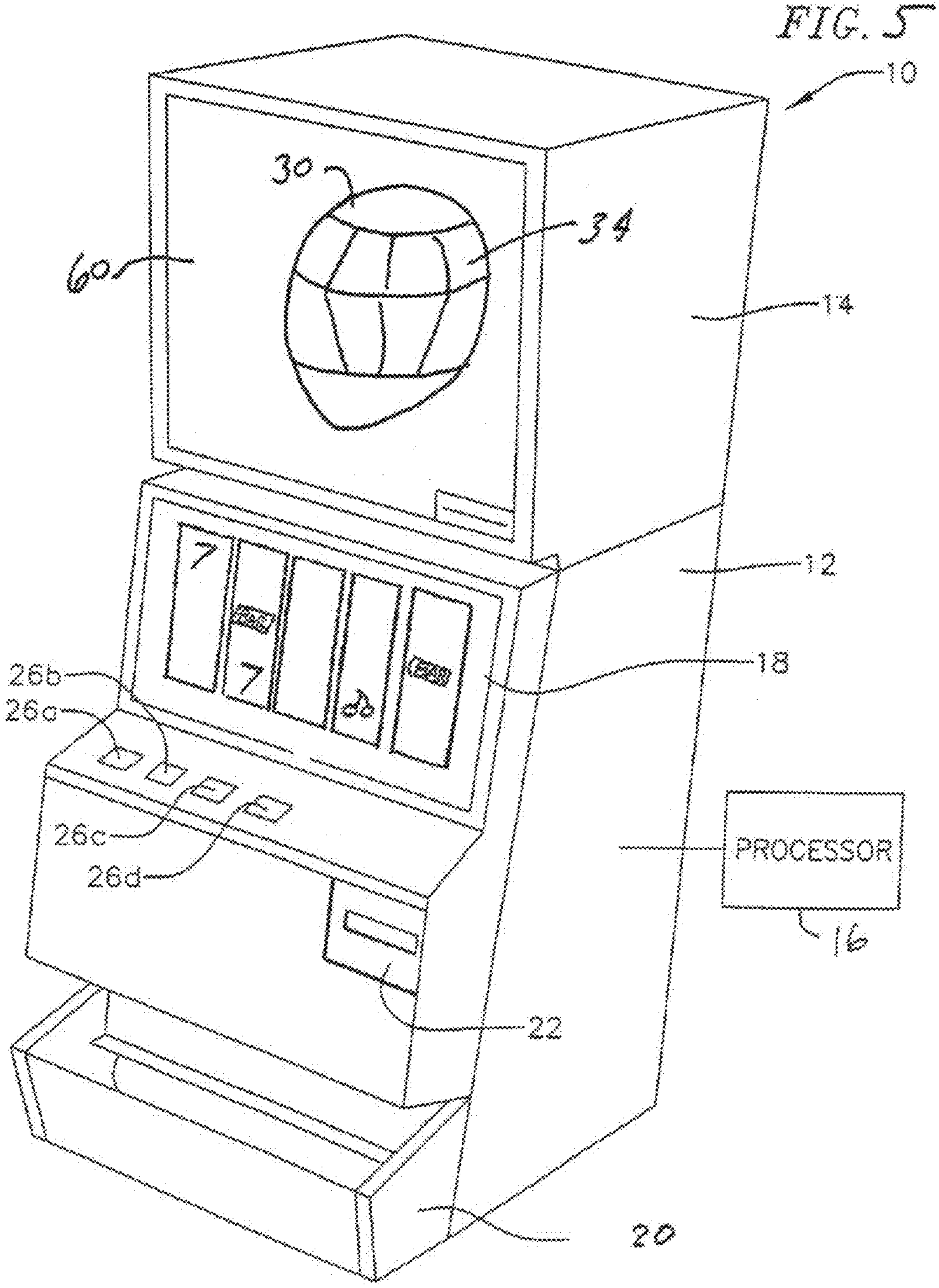
FIG. 5 shows an alternative apparatus where the bonus display is a video display.

Turning to FIG. 5 there is shown a further embodiment of FIG. 1 wherein the display includes a video display 60 such as a CRT or plasma display where the wheel 30 is a virtual sphere displayed at the display. The display 60 is controlled by the processor 16 to have an idle mode display where the display 60 may display the sphere 60 rotating and gyrating to attract a player to the device 10. The processor 16 controls the display 60 to display the sphere 30 in various modes including the display of any bonus awards.

Figure 6:
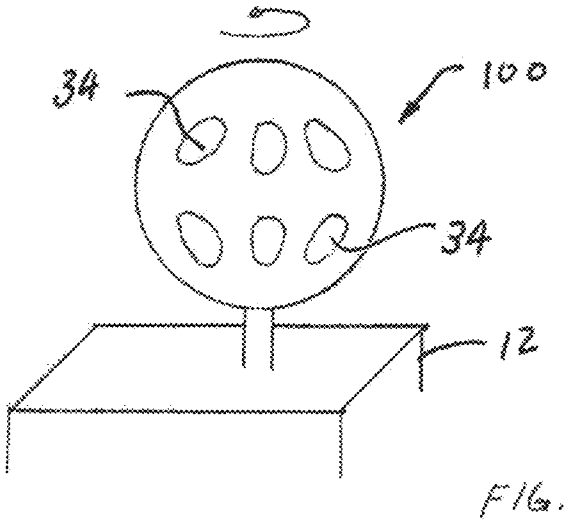
FIG. 6 shows an alternative apparatus where the bonus display is a video display.

FIG. 6 shows another embodiment of the bonus display 100 is embodied as a free standing sphere with panels 34 supported by the housing 12. The free standing sphere 100. By projecting the sphere above the housing 12, the device 10 presents an attractive game for players and for passersby.

Figure 7:
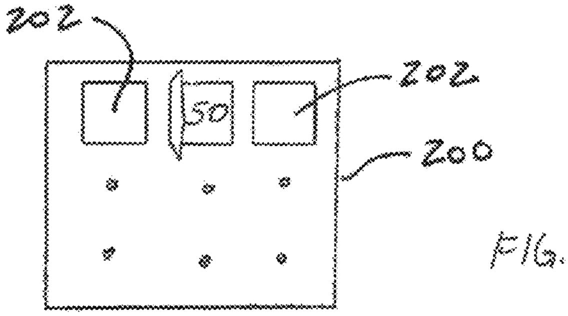
FIG. 7 shows an alternative apparatus where the bonus display is a video display.

In FIG. 7 there is shown a further embodiment of the bonus display embodied as a box 200 including a plurality of mechanical doors 202 which are controlled to open to reveal the bonus.

Figure 8:
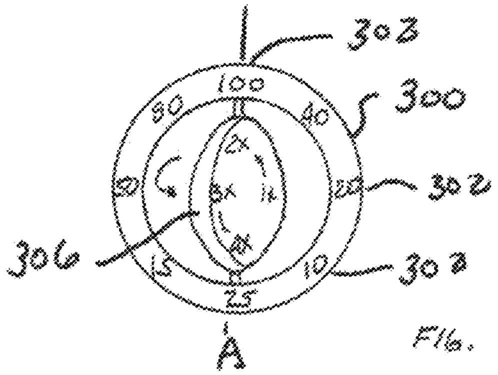
FIG. 8 shows an alternative apparatus where the bonus display is a video display.

FIG. 8 shows yet a further embodiment of the bonus display including an outer ring 300 to display bonus awards. For example, the outer ring 300 may include backlit segments 302 which are selectively backlit to display a bonus amount. Alternatively, the outer ring 300 may be controlled to spin or simulate spinning, to register the bonus award amount at an index position which signifies the award. Within the outer ring 300 is an inner display 306 which is controlled to spin about an axis A within the outer ring 300.

The inner display 306 contains a display of bonus award modifiers such as multipliers or additional award amounts. When the bonus is triggered, the outer ring 30 and inner display 306 are controlled by the processor 16 to (1) display an award amount from the outer ring 300 and (2) a modifier with the inner display 306. For example, the outer ring 300 may be controlled to simulate spinning to register a bonus award amount at an index, e.g., 100 credits. The inner display 306 spins and processes through various multiplier awards to eventually stop in a position coplanar with the outer ring 300 whereby a multiplier amount likewise registers with the index whereby the player wins the award of the outer ring 300 multiplied by the multiplier of the inner display 306.

It must be understood that the three-dimensional objects need not be spherical, oblong or any other shape. They could be cubical as a die with six or more sides, parallelpipedal or any other shape. Further, more than one object may be included in the display.

Figure 9:
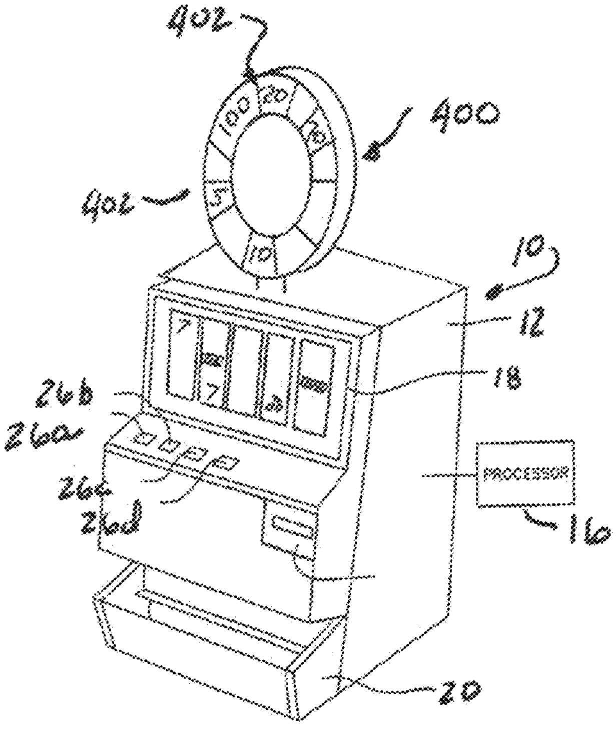
FIG. 9 shows a further alternative apparatus where the bonus display is a video display.

FIG. 9 shows another embodiment of the present invention. According to this embodiment the device 10 has a housing 12 supporting an upstanding video (LCD, CRT, plasma) display 400 which may be circular, square or any other desired shape. The display 400 reveals a plurality of award values 402 as controlled by the processor 16. The processor 16 may control the display 400 to display the values flashing or progressing or moving in the display 400 until the ultimate award is revealed.

While I have shown and described certain embodiments of the present invention, it should be understood that the same is subject to modification without departing from the spirit and scope of the invention.

What is claimed is:

1. A gaming machine for displaying computer-animated images, comprising:

a housing including a base game display including a first video display including a base game graphical user interface (GUI) display screen displaying computer-generated images thereon;

a bonus device compartment mounted above the base game display and including a second video display including a bonus game graphical user interface (GUI) display screen displaying computer-generated images thereon; and one or more gaming processors coupled to the first and second video displays and programmed to execute an algorithm to render a computer-animated sequence of computer-generated images of a game on the base game GUI and the bonus game GUI including the steps of:

animating a three dimensional image of a rotating wheel to appear on the bonus game GUI including a plurality of panels displaying changeable award amounts, the changeable award amounts being selected from a schedule of award amounts, a number of changeable award amounts in the schedule of award amounts being greater than a number of the changeable award amounts displayed on the rotatable wheel, the number of changeable award amounts in the schedule of award amounts are arranged in a non-uniform probability distribution;

animating images of a plurality of reels to appear on the base game GUI and spinning and stopping the plurality of reels to display an outcome of a base game;

randomly selecting a second award amount from the schedule of award amounts after stopping the plurality of reels;

modifying a panel displayed on the rotating wheel to replace an image of a displayed award amount with an image of the randomly selected second award amount; and animating the rotatable wheel to spin and stop to display an outcome of a bonus game including the modified panel displaying the image of the randomly selected second award amount.

2. The gaming machine of claim 1, wherein the one or more gaming processors is programmed to execute the algorithm including the steps of:

displaying the rotatable wheel including an inner display displaying bonus award modifiers and an outer ring displaying the plurality of panels displaying changeable award amounts.

3. The gaming machine of claim 2, wherein the one or more gaming processors is programmed to execute the algorithm including the steps of:

animating the inner display to spin about an axis within the outer ring.

4. The gaming machine of claim 3, wherein the one or more gaming processors is programmed to execute the algorithm including the steps of:

animating the outer ring to simulate spinning and stopping to register a bonus award amount at an index; and animating the inner display to simulate spinning and stopping to register a multiplier amount with the index.

5. The gaming machine of claim 1, wherein the one or more gaming processors is programmed to execute the algorithm including the steps of:

modifying the panel to replace a displayed award amount with the randomly selected second award amount upon detecting a triggering condition appearing in the outcome of the base game.

6. The gaming machine of claim 5, wherein the one or more gaming processors is programmed to execute the algorithm including the steps of:

detecting the triggering condition including a scattered symbols appearing in the outcome of the base game.

7. A method of operating a gaming machine to display computer-animated images, the gaming machine including a housing including a base game display including a first video display including a base game graphical user interface (GUI) display screen displaying computer-generated images thereon, a bonus device compartment mounted above the base game display and including a second video display including a bonus game graphical user interface (GUI) display screen displaying computer-generated images, and one or more gaming processors coupled to the first and second video displays, the method including the one or more processors performing an algorithm to render a computer-animated sequence of computer-generated images of a game on the base game GUI and the bonus game GUI including the steps of:

animating a three-dimensional image of a rotating wheel to appear on the bonus game GUI including a plurality of panels displaying changeable award amounts, the changeable award amounts being selected from a schedule of award amounts, a number of changeable award amounts in the schedule of award amounts being greater than a number of the changeable award amounts displayed on the rotatable wheel, the number of changeable award amounts in the schedule of award amounts are arranged in a non-uniform probability distribution;

animating images of a plurality of reels to appear on the base game GUI and spinning and stopping the plurality of reels to display an outcome of a base game;

randomly selecting a second award amount from the schedule of award amounts after stopping the plurality of reels;

modifying a panel displayed on the rotating wheel to replace an image of a displayed award amount with an image of the randomly selected second award amount; and animating the rotatable wheel to spin and stop to display an outcome of a bonus game including the modified panel displaying the image of the randomly selected second award amount.

8. The method of claim 7, including the one or more gaming processors executing the algorithm including the steps of:

displaying the rotatable wheel including an inner display displaying bonus award modifiers and an outer ring displaying the plurality of panels displaying changeable award amounts.

9. The method of claim 8, including the one or more gaming processors executing the algorithm including the steps of:

animating the inner display to spin about an axis within the outer ring.

10. The method of claim 9, including the one or more gaming processors executing the algorithm including the steps of:

animating the outer ring to simulate spinning and stopping to register a bonus award amount at an index; and animating the inner display to simulate spinning and stopping to register a multiplier amount with the index.

11. The method of claim 7, including the one or more gaming processors executing the algorithm including the steps of:

modifying the panel to replace a displayed award amount with the randomly selected second award amount upon detecting a triggering condition appearing in the outcome of the base game.

12. The method of claim 11, including the one or more gaming processors executing the algorithm including the steps of:

detecting the triggering condition including a scattered symbols appearing in the outcome of the base game.

13. A non-transitory computer-readable storage media having computer-executable instructions embodied thereon to operate a gaming machine to display computer-animated images, the gaming machine including a housing including a base game display including a first video display including a base game graphical user interface (GUI) display screen displaying computer-generated images thereon, a bonus device compartment mounted above the base game display and including a second, a bonus device compartment mounted above the base game display and including a second video display including a bonus game graphical user interface (GUI) display screen displaying computer-generated images thereon, and one or more gaming processors coupled to the first and second video displays, when executed by the one or more gaming processors the computer-executable instructions cause the one or more gaming processors to execute an algorithm to display a computer-animated sequence of computer-generated images of a game on the base game GUI and the bonus game GUI including the steps of:

animating a three-dimensional image of a rotating wheel to appear on the bonus game GUI including a plurality of panels displaying changeable award amounts, the changeable award amounts being selected from a schedule of award amounts, a number of changeable award amounts in the schedule of award amounts being greater than a number of the changeable award amounts displayed on the rotatable wheel, the number of changeable award amounts in the schedule of award amounts are arranged in a non-uniform probability distribution;

animating images of a plurality of reels to appear on the base game GUI and spinning and stopping the plurality of reels to display an outcome of a base game;

randomly selecting a second award amount from the schedule of award amounts after stopping the plurality of reels;

modifying a panel displayed on the rotating wheel to replace an image of a displayed award amount with an image of the randomly selected second award amount; and animating the rotatable wheel to spin and stop to display an outcome of a bonus game including the modified panel displaying the image of the randomly selected second award amount.

14. The non-transitory computer-readable storage media of claim 13, wherein the computer-executable instructions cause the one or more gaming processors to execute the algorithm including the steps of:

displaying the rotatable wheel including an inner display displaying bonus award modifiers and an outer ring displaying the plurality of panels displaying changeable award amounts.

15. The non-transitory computer-readable storage media of claim 14, wherein the computer-executable instructions cause the one or more gaming processors to execute the algorithm including the steps of:

animating the inner display to spin about an axis within the outer ring.

16. The non-transitory computer-readable storage media of claim 15, wherein the computer-executable instructions cause the one or more gaming processors to execute the algorithm including the steps of:

animating the outer ring to simulate spinning and stopping to register a bonus award amount at an index; and animating the inner display to simulate spinning and stopping to register a multiplier amount with the index.

17. The non-transitory computer-readable storage media of claim 13, wherein the computer-executable instructions cause the one or more gaming processors to execute the algorithm including the steps of:

modifying the panel to replace a displayed award amount with the randomly selected second award amount upon detecting a triggering condition including scattered symbols appearing in the outcome of the base game.

* * * * *